UNITED STATES PATENT OFFICE.

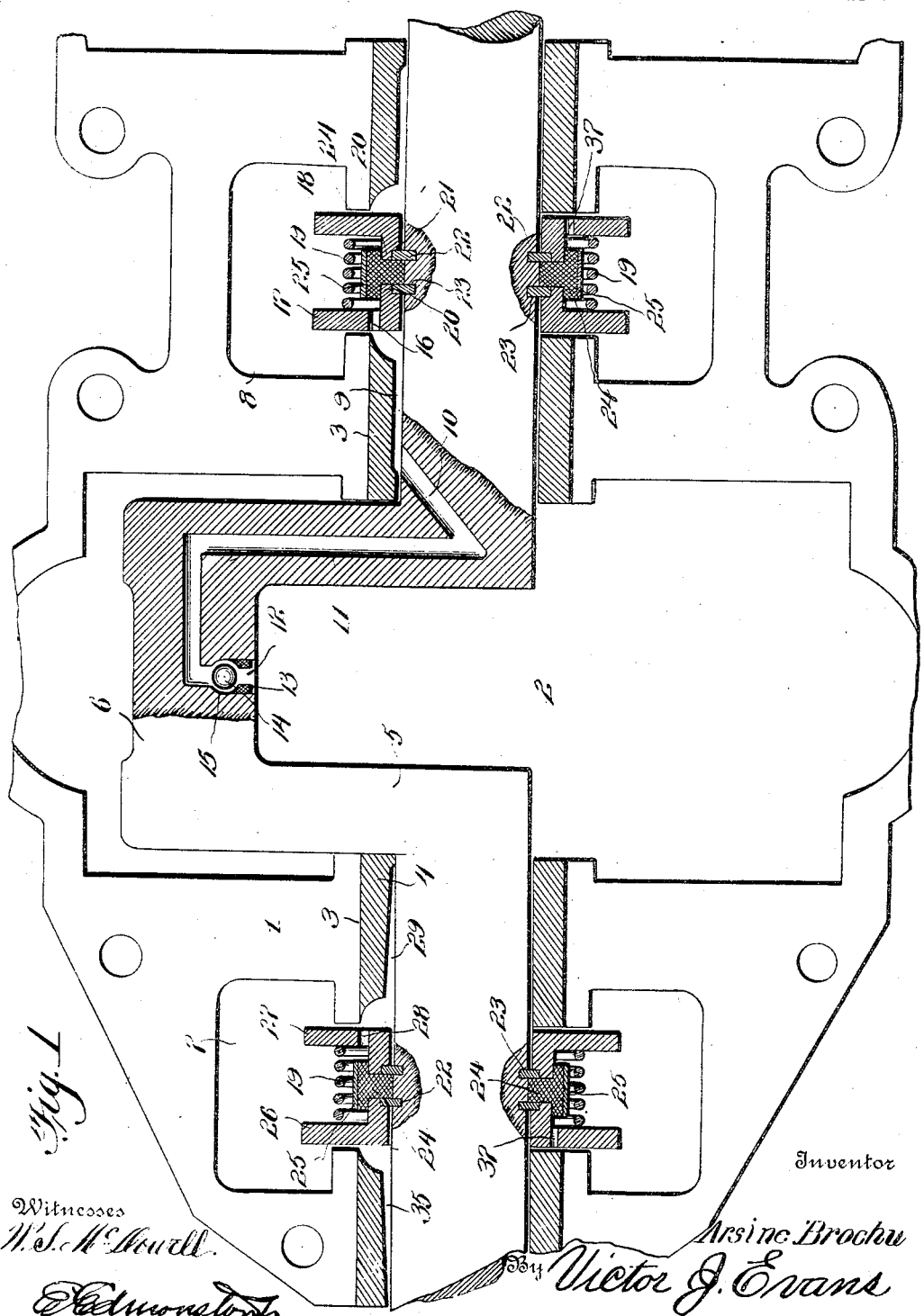

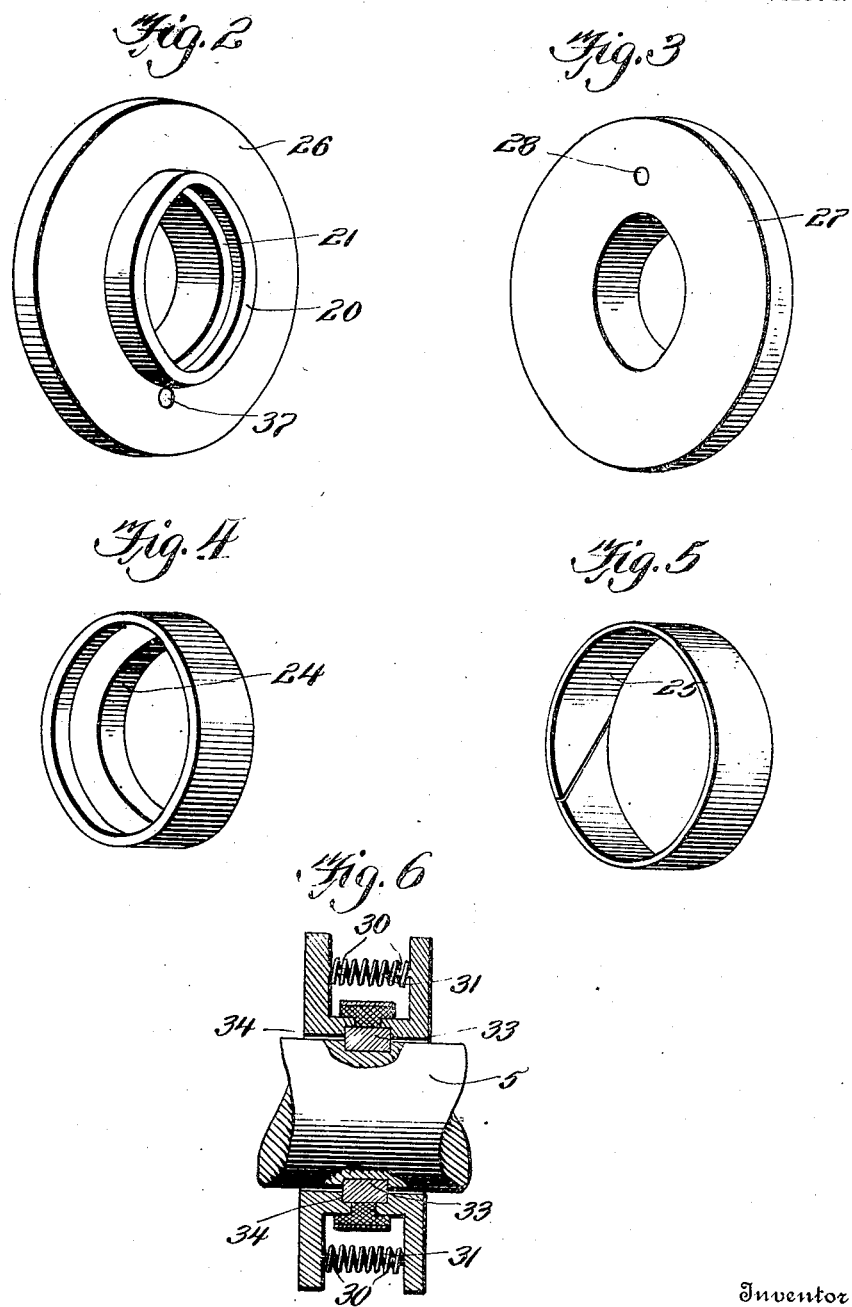

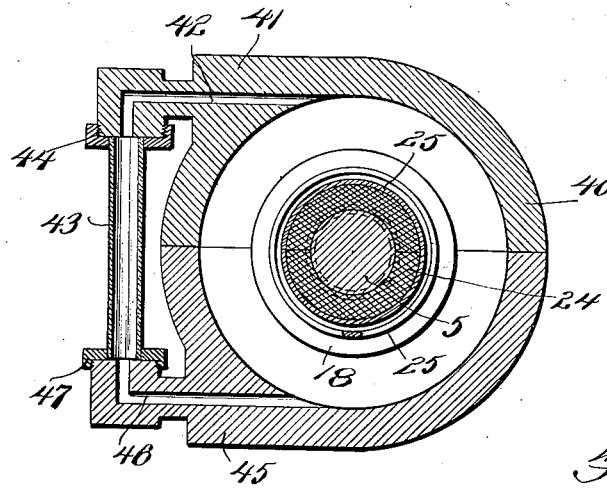
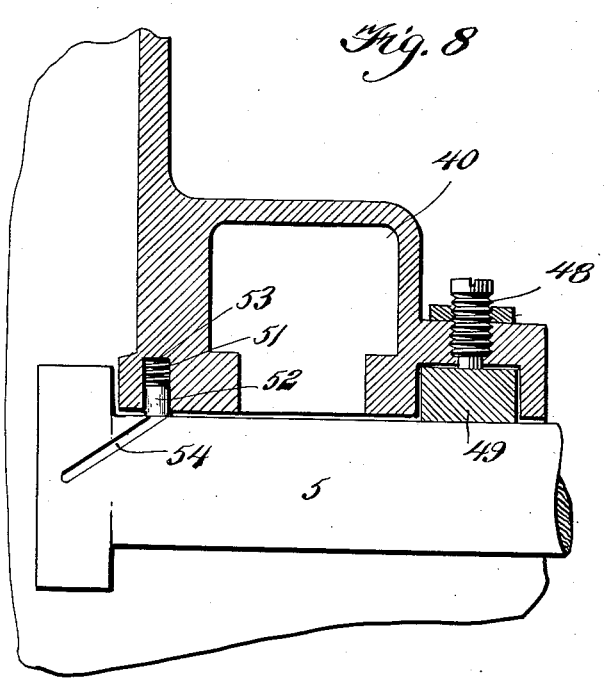
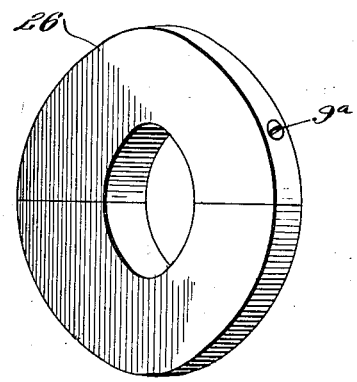

ARSINE BROCHU, OF FRANKLIN, NEW HAMPSHIRE.

SHAFT-BEARING AND LUBRICATOR THEREFOR.

1,070,109.   Specification of Letters Patent.   Patented Aug. 12, 1913.

Application filed June 22, 1911. Serial No. 634,673.

*To all whom it may concern:*

Be it known that I, ARSINE BROCHU, a citizen of the United States, residing at Franklin, in the county of Merrimack and State of New Hampshire, have invented new and useful Improvements in Shaft-Bearings and Lubricators Therefor, of which the following is a specification.

This invention relates to shaft bearings and more particularly to shaft bearings of two cycle internal combustion engines.

The object of the invention is to provide a bearing which will effectively hold the compression in the crank case and which will supply the proper amount of lubricant to the crank shaft and to the connecting rod.

Further objects of the invention will appear as the following specific description is read in connection with the accompanying drawing, which forms a part of this application, and in which:—

Figure 1 is a top plan view of a crank case base with the bearing shown in section. Fig. 2 is a perspective view of one of the rings employed. Fig. 3 is a similar view of the ring used where more than one cylinder is used. Fig. 4 is a perspective view of the packing employed. Fig. 5 is a similar view of the clamping ring for the packing. Fig. 6 is a sectional view showing a modified form of packing. Fig. 7 is a sectional view through one of the lubricant wells of Fig. 1. Fig. 8 is a section of modification with parts omitted. Fig. 9 is a perspective view of the type of packing ring used on one side of the crank when two or more cylinders are used.

Referring more particularly to the drawing, 1 represents the lower portion or base of a two cycle hydro-carbon engine crank case which is provided with a crank space 2 communicating with lateral apertures or recesses 3 in which the shaft bearing 4 is mounted. The ordinary crank shaft 5 is journaled in the bearings and is provided with the usual crank 6 for connecting the shaft with the pitman or connecting rod, not shown. On opposite sides of the crank space 2 the casing is shown as provided with lubricant wells 7 and 8 which communicate directly with the shaft through the separation in the bearing members 4.

The inner bearing member upon one side of the lubricant well 8 is provided with an oil channel 9 which communicates with a passage 10 extending diagonally through the shaft 5 and communicating with a similar passage 11 in the crank 6. The end of the passage 11 is enlarged, as shown at 12, and a valve ring 13 is mounted therein to prevent the escape and to limit the movement of a ball valve 14 which seats against the shoulder 15 formed by the enlargement of the channel or passage 11. The channel 9 communicates with the oil well or chamber 8 through a port 16 formed in a packing ring 17 which surrounds the shaft between the separate parts of the bearing 4 and abuts against the end of said bearing and the end wall of the well 8. A similar ring 18 surrounds the shaft and is held in spaced relation with the other ring 17 and against the opposite end of the bearing 4 and the opposite end wall of the well by a spiral spring 19 which is arranged between the rings. Both of these rings are provided with annular inwardly extending flanges 20 which are notched, as at 21, to receive the keys 22 for causing the rings to rotate with the shaft, the keys entering slots 23 in the shaft.

Surrounding the flanges 20 and lying in between the same, is a split packing ring 24 which is T-shaped in cross section. This packing ring is held in tight engagement with the shaft by means of a split spring ring 25 which constricts upon the packing ring and holds it firmly in engagement with the shaft at all times, irrespective of the wear thereof. Upon the opposite side of the crank 6 the space between the portions of the bearing 4 is filled in a like manner by packing rings 26 and 27, both lying within the chamber 7 and the latter of which is provided with a port 28 which communicates with a channel 29 formed in the inner portion of the bearing. Both of said rings 26 and 27 are formed in separate parts held together by a set screw 9ª, as shown in Fig. 9, so that where more than one cylinder is used the packing may be removed without disconnecting the entire shaft or removing both or all of the cylinders.

In the modification shown in Fig. 6, the packing rings are shown as supplied with inwardly extending pins 30 which enter the ends of spiral springs 31 bridged between the rings and adapted to hold them in separated relation. The shaft is shown as provided with a slot 32 in which a single key 33 is secured, said key extending across the packing and seating in slots 34 in the rings. In this instance the packing is caused to rotate with the rings and shaft while, in the preferred form, it is not positively connected to either part but does not have the slot necessary for the reception of the key, thus making less chance for leakage.

It will be noticed that the packing ring 24 and the packing rings 17 and 18 and 26 and 27 effectually prevent the escape of any gas in the crank case. At the up stroke of the piston the suction in the crank case will cause a certain amount of oil to be drawn from the chamber 8 through the ports 9, 10 and 11, past the valve 14, thus keeping the connecting rod properly lubricated. Upon the down stroke of the piston the pressure in the case will cause the valve 14 to seat against the shoulder 15 and prevent the oil in the channel 11 from being forced back into the chamber 8. At the time in which the well is in register with the channel 9 the suction and pressure is only momentary and therefore only a small quantity of oil passes the valve at each stroke and, if the valve does not work perfectly, only a small portion in the channel 11 is forced back into the oil well.

The outer ends of the bearings 4 are also grooved, as shown at 35, and the outside rings 18 and 26 are provided with channels 37 which register with the groove at certain times and which are supplied with predetermined quantities of lubricant. These channels are out of register with the grooves when compression is in the case.

As shown in Fig. 7, the top of the casing 40 has connected to it the head 41 having a port 42 therein which is connected to the sight glass 43 by a checking gland 44. A similar arrangement is connected to the lower half of the casing showing the head 45 having the port 46 and the packing gland 47.

In the modified form shown in Fig. 8, the top portion 40 of the casing has secured therein, beyond the well, an adjusting screw 48 which bears upon a packing plate 49 and holds the same against the shaft 5. The adjusting screw 48 is held in position by a clamp nut 50. Upon the opposite side of the well a recess 51 is formed in the upper part of the casing and seated therein is a packing segment 52 forced into engagement with the shaft 5 by means of a spring 53. This packing ring prevents oil from leaking beyond the crank channel 54 into the crank casing.

Having thus described the invention, what I claim as new is:—

1. In an engine, the combination with a crank case having an oil well, of a bearing member mounted in the case on opposite sides of the well, a crank shaft journaled in the bearing and passing through the well, said crank shaft having an oil passage, packing rings surrounding the shaft and lying within and against the walls of the oil well, and means comprising in part a plurality of ports in the rings for forming a communication between the oil well and the oil passage at each revolution of the shaft.

2. In an engine, the combination with a crank case having an oil well, bearing members mounted in the case on opposite sides of the well, a crank shaft journaled in the bearing members, said crank shaft having an oil passage, packing rings surrounding the shaft, between the bearing members and lying in the oil well, oil ports in said rings, means for holding said packing rings against the walls of the well, and means in the bearing members coacting with the ports in the packing rings for forming communication between the oil passage and oil well at predetermined intervals.

3. In an engine, the combination with a crank case having an oil well therein, of a bearing mounted in said crank case, a crank shaft journaled in the bearing, and oiling passage therein for the connecting rod adapted to communicate with the well, and means rotating with the shaft for connecting the oil well and the oiling passage in one position of the crank shaft only.

4. In a two-cycle internal combustion engine, the combination with a crank case, of a bearing therein, a shaft journaled in the bearings and having an oil passage extending through the crank thereof, a valve operating in the passage said crank case having an oil well therein, a port extending through the bearing and communicating with the passage in the crank at each rotation of the shaft and at or upon the suction stroke of the engine, and means for connecting the well with the port when said port is in communication with the passage.

5. In a two cycle internal combustion engine, the combination with a crank case having an oil well therein, of bearing members mounted in the crank case, a crank shaft journaled in the bearing members and passing through the oil well, packing rings surrounding the shaft and lying in the oil well, said packing rings having ports connecting the well and bearing, means for holding the packing rings against the walls of the oil chamber and against the ends of the bearing members, a packing arranged between the rings and in engagement with the shaft, and a spring surrounding the packing for taking up wear in the same.

6. In a two cycle internal combustion engine, the combination with a crank case having an oil well therein, of bearing members mounted in the crank case, a crank shaft journaled in the bearing members and passing through the oil well, packing rings surrounding the shaft and lying in the oil well, said packing rings having ports connecting the well and bearing, means for holding the packing rings against the walls of the oil chamber and against the ends of the bearing members, a packing arranged between the rings and in engagement with the shaft, and a spring for taking up wear in the packing, together with means for causing the rotation of the rings with the shaft.

7. In an engine, the combination with a crank case having a well therein, of a bearing member mounted in the casing on opposite sides of the well, a crank shaft journaled in the bearing member and passing through the well, channeled packing rings surrounding the shaft and lying within the well against the walls thereof, means forming a communication between the oil well and the shaft at each revolution of the shaft, and packing devices carried by the casing on opposite sides of the well.

8. In an engine, the combination with a crank casing having an oil well, of a bearing mounted in the casing on opposite sides of the well, a crank shaft journaled in the bearing and extending through the well, channeled packing rings surrounding the shaft and lying within the well against the walls thereof, means forming a communication between the oil wells and the shaft at each revolution of the shaft, and sight glasses connected to the casing and having communication with the well.

In testimony whereof I affix my signature in presence of two witnesses.

ARSINE BROCHU.

Witnesses:
 THOMAS F. CLIFFORD,
 AGNES L. GAHAGAN.